United States Patent [19]

Arenhold

[11] 4,315,634
[45] Feb. 16, 1982

[54] MUDGUARD FLAPS FOR MOTOR VEHICLES

[76] Inventor: Knut Arenhold, Westend 7, 2000 Hamburg 52, Fed. Rep. of Germany

[21] Appl. No.: 91,531

[22] Filed: Nov. 5, 1979

[30] Foreign Application Priority Data

Nov. 6, 1978 [DE] Fed. Rep. of Germany ....... 2848089

[51] Int. Cl.³ ............................................ B62D 25/16
[52] U.S. Cl. ............................................ 280/154.5 R
[58] Field of Search ..................... 280/154.5 R, 153 R, 280/153 A, 153 B, 152 R; 296/15; D12/185

[56] References Cited

U.S. PATENT DOCUMENTS 3,929,352  12/1975  Arenhold ..................... 280/154.5 R
3,953,053  4/1976   Arenhold ..................... 280/154.5 R

FOREIGN PATENT DOCUMENTS 807479   1/1959  United Kingdom ......... 280/154.5 R
1205076  9/1970  United Kingdom ......... 280/154.5 R Primary Examiner—David M. Mitchell
Attorney, Agent, or Firm—Murray & Whisenhunt

[57] ABSTRACT

A mudguard flap for attachment to a motor vehicle is provided having a flap main body and an adapter protrusion disposed upwardly from the flap main body. The adapter protrusion has a mounting area for attaching the flap to a fender-fold and for adjusting the flap to the chassis of a motor vehicle. In the present invention the adapter protrusion has a bending line thereon, which bending line follows generally the contour of the vehicle chassis in the vicinity of the place of attachment of the mudguard flap. The mounting area is bent along the bending line and is displaced from the plane of the unbent portion of the adapter protrusion to provide a bent angle of inclination, which when the mudguard flap is attached to the fender-fold results in the unbent portion of the adapter protrusion and the flap main body being at least generally parallel with the axis of the wheel.

13 Claims, 3 Drawing Figures

MUDGUARD FLAPS FOR MOTOR VEHICLES

The invention relates to a mudguard flap for motor vehicles having a flap main body and an adapter protrusion near the top thereof which allows for the alignment of the flap along the contour of the chassis or fender. By aligning at least one part of the mounting area of the adapter protrusion along the fender-fold of the fender, the mudguard flap may be mounted along the chassis of the vehicle.

BACKGROUND OF THE INVENTION

Mudguards of the present type are know. Generally, the flap's main body and the adapter protrusion are made as a single unit of rubber or some other rubber-like elastic material. Flaps are also known in which the upper area thereof consists of metal to which is joined an area of rubber or similar material. These types of flaps are provided with several types of mounting devices for connecting the flap to the fender-fold of a fender.

In an improved mudguard of this type, a bendable reinforcement plate is provided on the surface to the adapter protrusion or is embedded therein. To mount the mudguard on the chassis, bolts extend through this reinforcement plate as well as through the adapter protrusion, which are then screwed into the fender-fold. Or, the mounting is accomplished by means of clamps which engage the fender-fold and the reinforcement plate. Insofar that the reinforcement plate is bendable, it is therefore possible to bend and configure the orientation of the mudguard to different chassis curvatures and thus to adjust and align the mudguard with respect to the adjacent wheels of the vehicle.

The purpose of mudguard flaps attached to motor vehicles is to ensure that the water spray that is thrown upwardly by the wheels is guided under the vehicle and thus taken out of the flow-zone of the wheels. That is, the water should not be thrown out sideways far beyond the car. Rather it should be ejected as a tightly bundled beam in the middle of the vehicle. In order to achieve this kind of ejection of the water spray by means of mudguards, they should be mounted in such a way that they are at an angle to the vehicle's plane; that is, a transverse plane that runs parallel to the axis of the wheels. Thus, in an assembled state, the outside edge of the mudguard, in respect to the inside edge, runs diagonally to the rear, in respect to the direction of travel of the vehicle. That is, the outside edge of the mudguard attached to the vehicle is disposed forwardly of the inner edge of the mudguard.

In this latter regard, a major problem is encountered with modern passenger cars. The modern fender-fold portion of the chassis, which serves for mounting the mudguard, is inclined in the opposite direction, since this simplifies the forming and shaping of the corresponding chassis parts by the sheet metal presses. As a result, when a mudguard flap is directly mounted to the fender-fold, for example by means of a bendable reinforcement plate of the type described above, then the mudguard flap assumes an angle with respect to the vertical plane formed by the axis of the wheels, so that the outside edge of the mudguard flap on the vehicle is positioned behind the inner edge of the mudguard, i.e., is disposed rearwardly of the inner edge rather than the desired forwardly disposition, as explained above. Thus, the water spray is directed to the rear rather than to the middle of the vehicle.

To avoid this problem, it has been suggested that the mounting portion of the mudguard, that is, the point or points at which bolts or clamps are used to attach the mudguard to the fender, be provided with small wedges. These are used to prevent the unfavorable alignment of the mudguard. Experience has shown, however, that these wedges are not only difficult to mount and thus make the complete assembly of the mudguard flap much more difficult, but also that the use of wedges generally does not assure a sufficiently reliable mounting of the mudguard, especially when attachment clamps, rather than bolts, are used for this purpose.

Another attempt by the art to avoid the above-noted problem was that of attaching the mudguard to a convenient mounting point along the chassis so that the attachment would cause the mudguard to become bendable in the desired direction. This, however, requires a special connection to the chassis. Also, it is frequently very difficult to find a suitable mounting point along the chassis or, for that matter, to make that type of connection.

OBJECTS OF THE INVENTION

It is therefore an object of the invention to provide means for aligning and mounting the mudguard in the desired direction, with respect to the vertical plane of the axis of the wheels. It is a further object to provide the same without the necessity of using any special accessories and to accomplish this even when the chassis or fender-fold is slanted in the opposite direction, with respect to this plane. Other objects will be apparent from the following disclosure and claims.

BRIEF SUMMARY OF THE INVENTION

Figure 1:
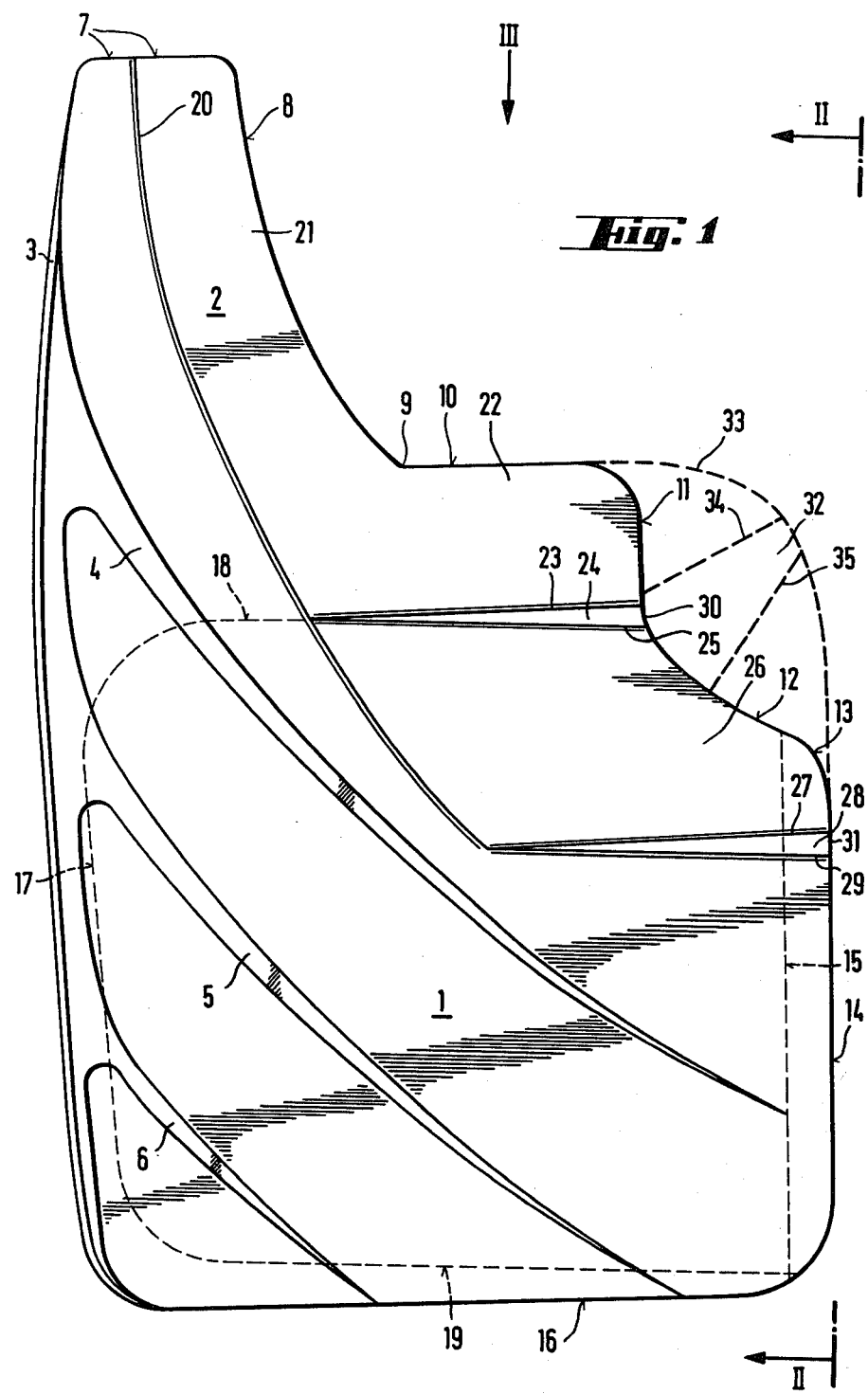
FIG. 1 is a plan view of the side of the mudguard facing a wheel in an assembled position.

Very briefly stated, the present invention is an improvement in a mudguard flap for attachment to a motor vehicle where the mudguard flap has a flap main body and an adapter protrusion disposed upwardly from the flap main body. The adapter protrusion has a mounting area for attaching the flap to a fender-fold and for adjusting the flap to the chassis of a motor vehicle. The present improvement comprises the adapter protrusion having a bending line thereon. The bending line generally follows the contour of the vehicle chassis in the vicinity of the place of attachment of the mudguard flap. The mounting area is bent along the bending line and displaced from the plane of the unbent portion of the adapter protrusion and the flap main body, to provide a bent angle of inclination which when the mudguard flap is attached to the fender-fold results in the unbent portion of the adapter protrusion and the flap main body being at least parallel with the axis of the wheel adjacent the mudguard flap. Preferably, the angle of inclination of the mounting area is larger than the angle of the fender-fold in the vicinity of the place of attachment of the mudguard flap, whereby the unbent portion of the adapter protrusion and the flap main body are at an angle to the axis of the adjacent wheel. It is especially preferred that the bending line is curved and the inclination of the bending line, in the lower and middle sections thereof, has an average angle of at least 20° and 25° with respect to the vertical, and especially from 30° to 45°. However, the bending line need not be curved and a straight bending line of the inclinations described is suitable for many applications. A membrane with breaker lines therein is also provided, which may be used in conjunction with the features noted above or with universal mudguards in general.

DETAILED DESCRIPTION OF THE INVENTION

An important feature of the present mudguard in solving the problem of the art, as discussed above, is that of providing a mounting area in an adapter protrusion disposed at the upper portion of a mudguard which mounting area is bent out of the plane of the unbent portion of the adapter protrusion and out of the plane of the main body of the flap along a bending line whose pattern corresponds somewhat to the chassis contour (or fender contour) in the vicinity of attachment of the mudguard flap to the fender-fold. The angle of bend generally corresponds to the angle of the fender-fold, in order to orient the flap main body generally parallel to the axis of the adjacent wheel.

In this way, the mudguard flap pursuant to the invention, has a mounting area, i.e., that area which when the mudguard flap is connected to the chassis engages the fender-fold, which, to a large extent, has the same angle of inclination as the angle of the fender-fold. Preferably, this inclination is even slightly larger than the angle of the fender-fold, so that the main body of the flap, and that part of the adapter protrusion which is not bent out, will rest in a transverse plane which is approximately parallel to the wheel axis. Preferably this plane is tilted with respect to the wheel axis in such a manner that the outside edge of the mudguard flap, attached to the vehicle, rests forwardly of the inside edge of the mudguard flap. This position of the mudguard flap is achieved automatically by the engagement of the mounting area of the adapter protrusion. Since the inclination of the mounting area approximately coincides with the angle of the fender-fold, the working surfaces of the fender-fold for the attachment clamps, i.e., the inside surface of the fender-fold, and the surface of the mounting area which faces the wheel (or the surface of a reinforcement plate that is adapted to this mounting area) will be approximately parallel to each other. Thus, there will be no danger that the attachment clamps will slip off or otherwise loosen.

It is pointed out that the term "mounting area" as used in this context, describes the area of the adapter protrusion which comes in contact with the fender-fold when the mudguard flap is attached to the chassis. Thus, it is assured that the mounting area is placed in the desired position during the mounting of the mudguard flap. Obviously, however, a larger area can be bent-out of this mounting area, if desired.

The course or shape of the deflection curve bending line around which the mounting area is deflected or bent out, corresponds, approximately, to the shape of the chassis in the vicinity of the fender-fold. Thus, it is a projection of this chassis curvature onto the vertical plane which is actually approximately parallel to the wheel axis. Accordingly, the shape of the fender-fold used for the engagement of the mounting area is important for determining the shape of the bending lines.

For the above reason, it is preferable that the pattern of the deflection curve bending line corresponds closely to the shape of the chassis of a given vehicle in the vicinity of the fender-fold. Since, however, the mudguard flap is used for different vehicles, it is only possible that the bending line, at least in the lower and middle regions, has on the average an angle of approximately 20° and 50°, especially 30° to 45° and preferably 35° in respect to the vertical, i.e., vertical with respect to the vehicle onto which the mudguard flap is to be affixed. In this way, an average value is obtained for the shape of the chassis of different modern cars. In the future, other cars with different chassis shapes will, of course, require an alteration of the shape of the deflection curve bending lines. The only important aspect, in this regard, is that in bending the mounting area, or the area that contains the mounting area, out of the plane of the flap's main body, the desired compensation for the slope of the fender-fold is obtained. In that case, and to ensure universal application of the present mudguard flap, widely divergent slopes of bending line patterns, and in an extreme case the edge of the mudguard flap, can be used.

The deflection curve bending line can be, for example, parallel to the inside edge (running edge) of the adapter protrusion or it can be in a straight line.

It should be noted, that the term "deflection curve bending line" in respect to the present mudguard flap describes sharp edged linings as well as transitions with relatively large radius of curvature, e.g., all the way upto "continuous" (step-less) transitions.

Before discussing the features of the present mudguard in more detail, reference is made to the Figures which provide a preferred embodiment of the invention. This preliminary discussion of the preferred embodiment will serve to clarify the broader aspects of the invention, as presented herein.

Thus, the mudguard flap shown in FIG. 1 is formed as one piece and consists of rubber-like material. It has a flap main body 1 and an adjoining adapter protrusion 2 extending upwardly.

On the surface of the mudguard flap shown in the plan view of FIG. 1, is located along the left hand edge, a rib 3 which runs more or less vertically. From rib 3, in a curved fashion and downwardly towards the right hand of the flap, ribs 4, 5 and 6 extend. The elevation of ribs 4, 5 and 6 in the immediate area of the junction with rib 3 is less than the height of the rib 3 and this height becomes smaller as ribs 4, 5 and 6 extend towards the right.

The function of rib 3, which in the mudguard flap's assembled state, constitutes the outside edge of the flap, is to prevent the egress of water towards the rear of the vehicle. Additionally, the rib serves to reinforce this area of the flap and prevent the upward flapping of the outside edge of the mud flap. The purpose of the ribs 4, 5 and 6 is that of guiding the water spray towards the middle of and under the vehicle.

As also indicated in FIG. 1, on the side which is opposite to the side which carries the rib 3, there is provided in the flap's main body 1 a so called "mirror", that is, a recess. This recess is bounded by edges 17, 18 and 19 (shown in dashed lines) and is generally in a flat configuration towards the right side of the flap. The adapter protrusion 2, generally, is primarily bounded by the upper part of rib 3, the upper edge 7, which in FIG. 1 runs horizontally, and the curved edge 8. It is disposed, therefore, vertically upwardly from the flap main body 1, whose horizontal upper edge 10 (at point 9) joins the inner curved edge 8 at the edge of adapter protrusion 2. Between the upper edge 10 and the right side edge 14 of the flap main body 1 is located a corner area which is defined by the corner edges 11, 12 and 13. To edges 11, 12 and 13 is joined a membrane 32 (shown by dashed lines) which will be described later. The flap main body 1 is bounded by rib 3, right side edge 14, lower edge 16, which runs mainly horizontally, and upper edge 10.

As mentioned above, and as can be seen especially in FIGS. 2 and 3, the vertical rib 3 is higher than the ends of ribs 4, 5 and 6 which join rib 3. Furthermore, as shown in FIG. 3, the rib 3 is inclined towards the outside edge of the flap.

Parallel to the inner curved edge 8 of the adapter protrusion 2 extends a deflection curve bending line 20 which runs from the upper edge 7 of the adapter protrusion 2 into the flap main body 1, where it ends at the intersection of the bending lines 27 and 29. Bending line 20 has, in its upper portion, an inclination of 5° to 10° and in the middle and lower portions of the adapter protrusion 2, an average inclination of about 20° to 25°. In the middle portion of bending line 20 in the flap main body 1, the inclination is about 25° to 30°. The mounting area 21 of the adapter protrusion 2 and the adjoining upper edge area 22 of the flap main body 1, that is the area between the upper edge 10 and a line running parallel and left of the bending line 20, is bent outwardly around the bending line 20, from the plane of the flap main body 1 and the remainder of the adapter protrusion 2. This can be seen in FIGS. 2 and 3. The inclination of the bend is about 16°.

Figure 2:
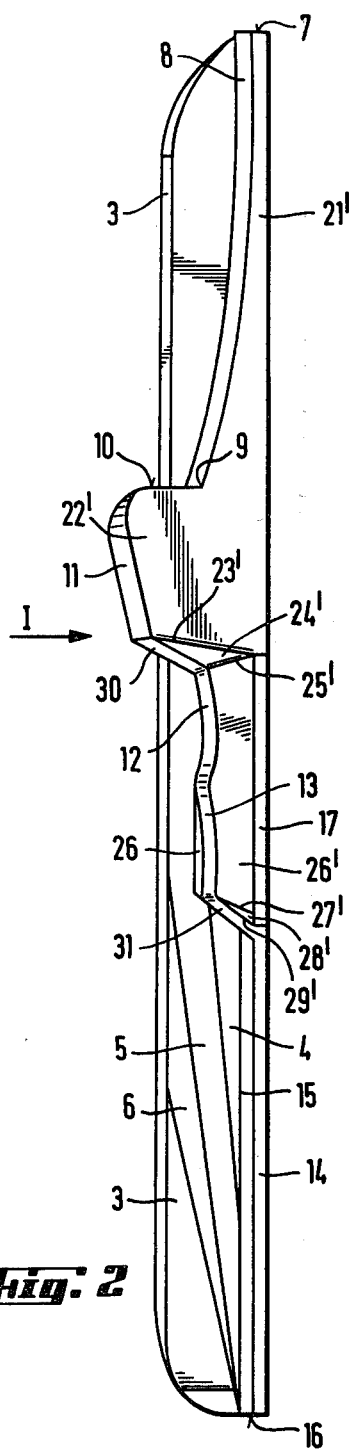
FIG. 2 is a right hand side view of the mudguard of FIG. 1.
Figure 3:
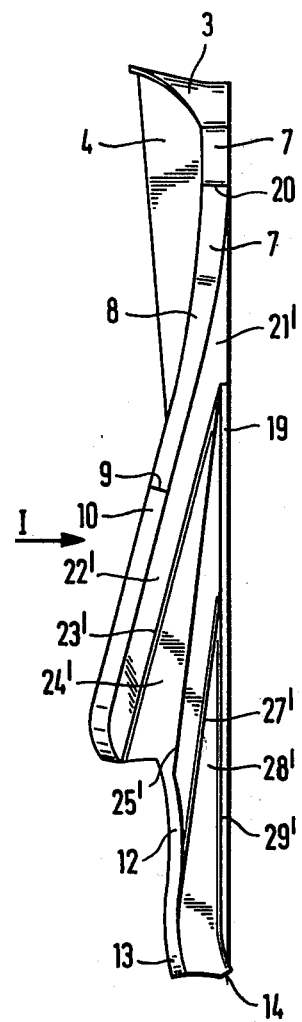
FIG. 3 is a top view of the mudguard of FIG. 1.

In this connection it should be noted that in FIGS. 2 and 3, the surfaces and bending lines corresponding to the surfaces and bending lines of FIG. 1, and the backside of the mudguard flap depicted in FIG. 1 have corresponding numbers but carry the additional prime (') mark.

The first bent out area of the mounting area 21 and upper edge area 22 is joined by an intermediate area 26 which is parallel to the upper edge area 22. This intermediate area is somewhat higher than the upper edge area 22 and is bent out from the flap main body 1 and the remainder of the adapter protrusion 2, so as to constitute a continuation of the bending line 20, which preferably follows the chassis curvature. It has the same direction as the mounting area 21 and the upper edge area 22 but has a smaller inclination, that is, about 8°. As a result, a bending line 23 is formed between the upper edge area 22 and the intermediate area 26 which joins the upper edge 22 as well as the bending line 25 which joins the intermediate area 26. Between these bending lines is a transition region 24 which connects the upper edge area 22 with the intermediate area 26. Obviously, the free edge 30 of the transition region 24, joins the corner edges 11 and 12 of the flap main body 1. The intermediate area 26 ends at its bottom along the bending line 27 from whence a transition zone 28 extends to the bending line 29 which rests in the plane of the flap main body 1. The free edge of the transition zone 28 connects the corner edge 13 of the flap main body 1 with the right side edge 14.

The right side edge 14 (FIG. 1) of the flap main body 1 is actually bent out of the flap main body 1 around a bending line 15 (dashed line) in the opposite direction to the intermediate area 26. Also, as a corresponding continuation of the bending line 15, the edge of the intermediate area 26 is curved in the opposite direction. By means of this curvature, which is especially noticeable in the lower part of FIG. 3, the water spray is guided to the middle of the vehicle even more strongly as this area is more bent towards the rear relative to the direction of travel of the vehicle.

As shown by dashed lines in FIG. 1, the cutout corner area of the flap main body 1 as defined by the corner edges 11, 12 and 13 can be provided with a membrane 32 made of a thinner material. This will fill out the entire corner zone. This membrane consists of the same material as the rest of the mudguard flap and is produced in one and the same work process step. However, the material is thinner than the rest of the mudguard flap. Inside the membrane, from the membrane outer edge 33 to corner edges 11 and 12 and in the same direction, are disposed diverging preset breaker lines 34 and 35. These can be made in form of perforations or thinner sections in the material.

This membrane can be pushed aside during the assembly of the mudguard flap on the vehicle or can be cut along the preset breaker lines should this be necessary as when the corner area must be removed to accomodate parts of the vehicle. When there is sufficient assembly space, the membrane simply fills out the upper inner corner area of the flap main body 1.

To attach the mudguard flap along the fender-fold there may be used, for example, a bendable flat sheet metal strip attached to the mudguard in such a manner that it extends across the mounting area 21 and also, if desired, across the area of 22. Thus, it will have the same inclination in respect to the plane of flap main body 1 and the remaining part of the adapter protrusion 2 as the mounting area 21 and upper edge 22. It is self-evident that the width of the sheet metal strip must be less than the distance between the inner curved edge 8 of protrusion 2 and bending line 20. It must also be less than the distance between the upper edge 10 and bending line 23.

The mudguard flap that is thus reinforced can be attached to the fender-fold by means of bolts or suitable clamps. When the mounting area 21 and the upper edge area 22 are aligned somewhat in parallel with the fender-fold, then the lower edge 16 of the flap main body 1 will run largely in parallel with the wheel axis. But when the angle of the bent out portion of mounting area 21 and the area of upper edge 22 is larger than the inclination of the fender-fold, then the outside edge 3 along the vehicle will be forward of bending line 15 and, of course, will also be forward of right side edge 14. This last described arrangement is, as described above, the preferred arrangement. It assures that the mudguard flap will be tilted, with respect to the wheel axis, i.e., with respect to a vertical plane through the wheel axis. Thus, the water spray will not be deflected outwardly but rather towards the middle and under the motor vehicle.

With this type of assembly it is, of course, possible that the flap main body 1 will not rest vertically but rather will slope either towards the adjacent wheel or away from that wheel. While a certain tilt away from the wheel is harmless, a tilt towards the wheel should be avoided. This latter sloping can be corrected in a well known manner. A sheet metal strip is suitably bent which will change the position of the mudguard flap in the desired manner.

The intermediate area 26, which is bent out somewhat less than the upper edge area 22, is especially advantageous when the end of the fender-fold that is beneath the mounting area is inclined in the direction of the adjacent wheel. The fender-fold end will project toward the plane of flap main body 1. By bending outwardly the intermediate area 26, a free space is formed for this end of the fender-fold and this end will, therefore, not push the flap main body 1 away from its favorable position.

As can be appreciated from the foregoing description of the Figures, an imporant feature of the invention is the provision for bending out mounting area 21 so as to compensate for the slope of the fender-fold. While this angle may vary widely, for modern cars, the angle will usually be between 5° to 25°, especially 10° to 20° and most preferably about 15°, with respect to the plane of the unbent portion of the adapter protrusion 2 of the mudguard flap. However, even here it is possible to select a mean value if the mudguard flaps are to be used with different model cars. The bent-out mounting area 21 is preferably flat in form, at least for the most part.

In order to attain a still better alignment of the mudguard flap to the shape of the chassis, the upper edge area 22 of the mudguard flap can be turned outwardly in the same direction as the mounting area of the adapter protrusion 2 from the plane of the residual part of the adapter protrusion 2 of the flap main body 1. This assures that the desired alignment of the mudguard flap will be provided with a relatively close fit along the fender-fold, even in those cases where the fender-fold extends into the upper edge area 22 of the flap main body. The degree of deflection of the upper edge 22 corresponds preferably to that of the mounting area 21 so that an even shaped overall area may be formed. In order to assure, even in this case, a simple design and manufacturing process for the mudguard flap, the upper edge area 22 of the flap main body 1 is preferably bent out by the extension of the deflection bending line 20. That is, the bending out of the mounting area 21 of the adapter protrusion 2 and upper edge area 22 of the flap main body 1 takes place around a common bending line. Furthermore, this upper edge area 22 can have a certain inclination with respect to the vertical.

Some motor vehicles have a lower end of the fender-fold so that it is not the furthest point from the wheel axis. Rather, as result of continuing the chassis contour, the lower end of the fender-fold approaches the wheel axis. This type of contour leads to the following problem. The mudguard flap that is attached above the fender-fold end is turned around by this fender-fold and into the direction of the wheel. This means that, on the one hand, the flap main body 1 no longer will run in a plane but rather that it will be tilted with respect to the wheel. On the other hand, the desired tilt with respect to a vertical plane through the wheel axis will not be achieved.

In order to overcome this difficulty the mudguard flap of the present invention can be provided with a bent out intermediate area 26 that is located beneath the bent out edge area and adjacent thereto. This intermediate area 26 is bent in the same direction, but somewhat less so than the plane of the remainder of the adapter protrusion 2. Preferably, it is bent about an extension of the bending line 20 of the upper edge area 22 and tilted with respect to the vertical plane.

By means of the bent out intermediate area 26, the mudguard flap will no longer be in the zone into which the fender-fold end extends. That is, the area that is gained by bending out the intermediate area 26 will serve to accomodate the fender-fold end without bringing this end into contact with the mudguard flap. Additionally, the bent out intermediate area 26 will provide a transition between the bent out moutning area 21 and upper edge area 22 so that the remainder of the flap main body 1 and the remainder of the adapter protrusion 2 and the bent out mounting area 21 and edge area 22 are not so visible.

As mentioned above, the purpose of the mudguard flap is to guide the water spray toward the center of and below the car. In order to increase this effect even more, edge 14 of the flap main body 1 can be bent out of the plane of the flap main body 1 in the opposite direction with respect to the mounting area 21. This provies an additional tilt to a portion of the flap main body 1, with respect to a vertical plane passing through the axis of the wheel. This further improves the proper guiding of the direction of the water spray.

When mudguard flaps are to be used for different motor vehicles, difficulties are frequently encountered insofar as the upper edge area 22 of flap main body 1 should be inside the chassis or fender. In some cases this area must be partially cut away since parts of the vehicle (fender) are located in this area. On the other hand, it is advantageous to keep this upper edge area 22 as close as possible to the fender. Thus, for certain vehicles, cutout sections should be provided.

In order to cope with this difficulty, the mudguard flap of this invention may be provided with a flap main body 1 and adapter protrusion 2 in which the upper edge area 22 of the flap main body 1 is recessed. This recess is provided with a membrane 32 made of rubber-elastic material, preferably of the same kind of material as is used for the manufacture of the mudguard flap itself, but thinner. This will assure that the work can be done in one manufacturing step. Leading from the peripheral edge of membrane 32 to its junction with the flap main body 1 extend preset breaker lines 34 and 35. These breaker lines diverge, preferably from the peripheral edge of the membrane to the point of junction with the flap main body 1.

By using this type of membrane 32, equipped with preset breaker lines, there is obtained an enclosed upper edge area 22 of the flap main body 1. There is, of course, no need to cut out this area in those cases where the motor vehicle has no parts located in this area. However, when parts are so located by simply pressing membrane 32 against this car part, it will either bend or be cut along the preset breaker lines 34 and 35 and thus allow mounting of the mudguard flap without being affected by the presence of such car parts.

What is claimed is:

1. In a mudguard flap for attachment directly to the fender-fold of a motor vehicle, behind a vehicle wheel said mudguard flap having a flap main body and an adapter protrusion disposed upwardly from the flap main body, said adapter protrusion having a mounting area for attaching the flap to the fender-fold and for aligning the flap to the chassis of a motor vehicle, the improvement comprising the adapter protrusion having a bending line thereon, said bending line following generally the contour of the vehicle chassis in the vicinity of the place of attachment of the mudguard flap, said mounting area being bent forwardly along said bending line and being displaced from the plane of the unbent portion of the adapter protrusion and the flap main body to provide a bent angle of inclination of from 5° to 25°, whereby when said forwardly bent out mounting area of the mudguard flap is attached to a fender-fold, the unbent portion of the adapter protrusion and the flap main body are at least generally parallel with the axis of the wheel adjacent the mudguard flap.

2. A mudguard flap according to claim 1 wherein the angle of inclination of the mounting area is larger than the angle of the fender-fold in the vicinity of the place of attachment of the mudguard flap whereby the unbent portion of the adapter protrusion and the flap main body are at an inward and rearward angle to the axis of the adjacent wheel.

3. A mudguard flap according to claim 1 or claim 2 wherein the bending line is curved and the inclination of the bending line in the lower and middle sections thereof, has an average angle of at least 20° to 25° with respect to the vertical.

4. A mudguard flap according to claim 3 wherein said angle of the inclination of the bending line is from 35° to 45°.

5. A mudguard flap according to claim 1 wherein the bending line runs generally parallel to a running inner curved edge of the adapter protrusion.

6. A mudguard flap according to claim 1 wherein the bending line includes a straight line.

7. A mudguard flap according to claim 1 wherein in addition to the bend of the mounting area, an upper edge arrea of the flap main body is bent from the plane of the remaining part of the adapter protrusion and the flap main body in the same direction as the mounting area of the adapter protrusion.

8. A mudguard flap according to claim 7 wherein the upper edge area is bent about an extension of the said bending line.

9. A mudguard flap according to claim 7 or claim 8 wherein adjacent to the bent upper edge area there is provided an intermediate area which is bent in the same direction as the upper edge area but the bend is less than the bend of the upper edge area.

10. A mudguard flap according to claim 9 wherein the intermediate area is bent about an extension of the bending line of the upper edge area.

11. A mudguard flap according to claim 1 wherein the inner side edge of the flap main body, when assembled on a vehicle, is bent in the direction opposite to that of the bend of the mounting area, in respect to the plane of the flap main body.

12. A mudguard flap according to claim 1 having cut out upper and inner corner edges of the flap main body and adjoining the cut out corner edges is a membrane, said membrane being attached to the flap main body and made of a rubber-elastic material, and wherein from an exterior edge of the membrane to connection between the membrane and the flap main body are a plurality of preset breaker lines.

13. A mudguard flap according to claim 12 wherein the preset breaker lines diverge from the exterior edge of the membrane to the connection with the flap main body.

* * * * *